United States Patent
Kitano

(10) Patent No.: US 8,111,026 B2
(45) Date of Patent: Feb. 7, 2012

(54) ELECTRIC MOTOR DRIVE APPARATUS, HYBRID VEHICLE WITH THE SAME AND STOP CONTROL METHOD OF ELECTRIC POWER CONVERTING DEVICE

(75) Inventor: Eiji Kitano, Toyota (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 727 days.

(21) Appl. No.: 12/278,364

(22) PCT Filed: Jan. 18, 2007

(86) PCT No.: PCT/JP2007/051122
§ 371 (c)(1),
(2), (4) Date: Aug. 5, 2008

(87) PCT Pub. No.: WO2007/091428
PCT Pub. Date: Aug. 16, 2007

(65) Prior Publication Data
US 2009/0058339 A1    Mar. 5, 2009

(30) Foreign Application Priority Data

Feb. 6, 2006  (JP) ................................ 2006-028120
Feb. 23, 2006 (JP) ................................ 2006-046940

(51) Int. Cl.
*H02P 1/00* (2006.01)
(52) U.S. Cl. .......................................... 318/139; 318/34

(58) Field of Classification Search .................. 318/139, 318/34, 41
See application file for complete search history.

(56) References Cited

U.S. PATENT DOCUMENTS

| | | | | |
|---|---|---|---|---|
| 3,593,103 A * | 7/1971 | Chandler et al. | ............... | 363/174 |
| 4,893,479 A * | 1/1990 | Gillett et al. | ................... | 62/213 |
| 5,365,153 A * | 11/1994 | Fujita et al. | ..................... | 318/34 |
| 6,163,088 A * | 12/2000 | Codina et al. | .................... | 307/64 |
| 6,917,179 B2 * | 7/2005 | Komatsu et al. | ............... | 318/700 |
| 7,269,535 B2 * | 9/2007 | Kishimoto | ..................... | 702/183 |
| 2003/0081440 A1 | 5/2003 | Komatsu et al. | | |

FOREIGN PATENT DOCUMENTS

| | | | |
|---|---|---|---|
| JP | 62-110482 | A | 5/1987 |
| JP | 08-029470 | A | 2/1996 |
| JP | 10-014097 | A | 1/1998 |
| JP | 10-191503 | A | 7/1998 |
| JP | 2003-204606 | A | 7/2003 |
| JP | 2003-244801 | A | 8/2003 |
| JP | 2005-130615 | A | 5/2005 |

* cited by examiner

*Primary Examiner* — Rina Duda
(74) *Attorney, Agent, or Firm* — Sughrue Mion, PLLC

(57) ABSTRACT

An ECU activates a shutdown permission signal and provides it to an AND gate when a shutdown signal is inactive. Thus, when an abnormality sensing device does not sense an abnormality, the ECU always keeps the shutdown permission signal active. The AND gate performs logical AND between a signal provided from the abnormality sensing device and the shutdown permission signal to provide the shutdown signal to inverters. When a limp-home run permission signal becomes active while the shutdown signal is active, the ECU inactivates the shutdown permission signal.

17 Claims, 7 Drawing Sheets

ELECTRIC MOTOR DRIVE APPARATUS, HYBRID VEHICLE WITH THE SAME AND STOP CONTROL METHOD OF ELECTRIC POWER CONVERTING DEVICE

TECHNICAL FIELD

The invention relates to an electric motor drive apparatus driving an electric motor mounted on a hybrid vehicle, a hybrid vehicle equipped with the electric motor drive apparatus and a stop control method of an electric power converting device.

BACKGROUND ART

In recent years, large attention has been given to a hybrid vehicle equipped, as drive power sources, with a battery, inverters and motors driven by the inverters in addition to a conventional engine.

Japanese Patent Laying-Open No. 10-191503 has disclosed a hybrid vehicle that can perform limp-home run (batteryless run) in which a power generator is used for driving a vehicle while avoiding use of a battery that has a certain failure. In this hybrid vehicle, when it is determined that the battery is unusable, a system main relay is turned off to isolate a battery from a power generator and a load, and the power generator operates so that a power generation output of the power generator follows the load.

In this hybrid vehicle, even when the battery that can function as an electric power buffer is isolated, the power generation output of the power generator follows the load so that a smoothing capacitor can be protected from overvoltage breakdown.

However, when the battery is suddenly isolated due to a break in a wire of the system main relay, or when a booster device malfunctions in a system having the booster device between the battery and the inverter, an unexpected overvoltage may rapidly occur due to the power supplied from the power generator. In view of this situation, therefore, even the foregoing hybrid vehicle must keep a capacitance margin of the smoothing capacitor to a certain extent, and this increases sizes of the capacitor.

DISCLOSURE OF THE INVENTION

Accordingly, the invention has been made for overcoming the above problem, and an object of the invention is provide an electric motor drive apparatus that can reduce a margin of a smoothing capacitor.

Another object of the invention is to provide a hybrid vehicle provided with an electric motor drive apparatus that can reduce a margin of a smoothing capacitor.

Still another object of the invention is to provide a stop control method of an electric power converting device that can reduce a margin of a smoothing capacitor.

According to the invention, an electric motor drive apparatus includes a capacitance element smoothing a DC voltage; an electric power converting device performing electric power conversion between the capacitance element and at least one electric motor; an abnormality sensing device sensing an abnormality relating to the capacitance element, and providing a signal being activated when the abnormality is sensed; a control device activating and providing a shutdown permission signal for permitting shutdown of the electric power converting device at least before the abnormality sensing device senses the abnormality; and a shutdown circuit activating a shutdown signal instructing shutdown of the electric power converting device and providing the shutdown signal to the electric power converting device when the signal provided from the abnormality sensing device becomes active while the shutdown permission signal is active.

First to fifth embodiments that will be described later correspond to this invention. More specifically, a capacitor C1 in the first, second and fifth embodiments as well as a capacitor C2 in third, fourth and fifth embodiments correspond to the foregoing "capacitance element". A booster converter 10 and inverters 20 and 30 in the first and fifth embodiments, a booster converter 10A and inverters 20 and 30 in the second embodiment, and inverters 20 and 30 in the third, fourth and fifth embodiments form the foregoing "electric power converting device".

Preferably, the electric motor drive apparatus further includes a DC power supply; and a booster device boosting a voltage provided from the DC power supply and providing the boosted voltage to the capacitance element. The electric power converting device includes a drive device converting the voltage provided from the capacitance element and driving the at least one electric motor.

The fourth embodiment that will be described later corresponds to this invention. More specifically, in the fourth embodiment, capacitor C2 corresponds to the foregoing "capacitance element", and inverters 20 and 30 form the foregoing "drive device".

Further preferably, the electric motor drive apparatus further includes a DC power supply providing a voltage to the capacitance element. The electric power converting device includes a booster device boosting a voltage provided from the capacitance element, and a drive device converting the voltage boosted by the booster device and driving the at least one electric motor. The shutdown circuit activates the shutdown signal and provides the shutdown signal to the drive device when the signal provided from the abnormality sensing device becomes active while the shutdown permission signal is active.

The first and second embodiments that will be described later correspond to this invention. More specifically, in the first and second embodiments, capacitor C1 corresponds to the foregoing "capacitance element". Booster converter 10 and inverters 20 and 30 in the first embodiment as well as booster converter 10A and inverters 20 and 30 in the second embodiment form the foregoing "electric power converting device". Booster converters 10 and 10A correspond to the foregoing "booster device", and inverters 20 and 30 form the foregoing "drive device".

Preferably, the electric motor drive apparatus includes a DC power supply; one additional capacitance element smoothing the voltage supplied from the DC power supply; and a booster device boosting a voltage supplied from the one additional capacitance element and providing the boosted voltage to the capacitance element. The electric power converting device includes a drive device converting the voltage supplied from the capacitance element and driving the at least one electric motor. The abnormality sensing device further senses an abnormality relating to the one additional capacitance element, and activates the signal when the abnormality is sensed in at least one of the capacitance element and the one additional capacitance element.

The fifth embodiment that will be described later corresponds to this invention. More specifically, in the fifth embodiment, capacitor C2 corresponds to the foregoing "capacitance element", and capacitor C1 corresponds to the foregoing "one additional capacitance element". Booster converter 10 corresponds to the foregoing "booster device", and inverters 20 and 30 form the above "drive device". Further, abnormality sensing devices 40 and 82 from the above "abnormality sensing devices".

Preferably, the booster device is shut down when the signal from the abnormality sensing device becomes active.

Preferably, the control device inactivates the shutdown permission signal when a predetermined condition is satisfied after the drive device of the electric power converting device is shut down according to the shutdown signal.

Further preferably, the drive device can drive first and second electric motors corresponding to the at least one electric motor in a regenerative mode and a power running mode, respectively. The predetermined condition is satisfied when a limp-home operation of driving the second electric motor using an electric power generated by the first electric motor without using an electric power supplied from the DC power supply is allowed.

Further preferably, the drive device can drive first and second electric motors corresponding to the at least one electric motor in a regenerative mode and a power running mode, respectively. The predetermined condition is satisfied when a limp-home operation of driving the second electric motor using an electric power supplied from the DC power supply is allowed.

Further preferably, the first electric motor is coupled to an internal combustion engine. When the abnormality sensed by the abnormality sensing device is not present, the internal combustion engine generates at least one of a drive power for generating the electric power by the first electric motor and a drive power for a vehicle, and the second electric motor generates the vehicle drive power, using the electric power supplied from at least one of the DC power supply and the first electric motor.

Preferably, the abnormality sensing device activates the signal when a voltage across opposite terminals of the capacitance element or the one additional capacitance element exceeds a predetermined threshold.

Further preferably, when the abnormality sensing device senses an abnormality in the device itself, the abnormality sensing device activates the signal.

Further, according to the invention, an electric motor drive apparatus includes a DC power supply; a capacitance element smoothing a voltage supplied from the DC power supply; a booster device boosting a voltage supplied from the capacitance element; first and second drive devices driving first and second electric motors based on the voltage boosted by the booster device, respectively; a voltage sensing device sensing a voltage across opposite terminals of the capacitance element; an abnormality sensing device providing a signal to be activated when the voltage sensed by the voltage sensing device exceeds a predetermined threshold; a control device activating and providing a shutdown permission signal for permitting shutdown of the first and second drive devices at least before the abnormality sensing device senses the abnormality; and a shutdown circuit activating a shutdown signal instructing shutdown of the first and second drive devices and providing the shutdown signal to the first and second drive devices when the signal provided from the abnormality sensing device becomes active while the shutdown permission signal is active.

The first embodiment that will be described later corresponds to this invention. More specifically, in the first embodiment, capacitor C1 corresponds to the foregoing "capacitance element". Booster converter 10 corresponds to the foregoing "booster device". Inverters 20 and 30 correspond to the foregoing "first and second drive devices", and a voltage sensor 72 corresponds to the foregoing "voltage sensing device". Further, abnormality sensing device 40 corresponds to the foregoing "abnormality sensing device", and an ECU 60 corresponds to the foregoing "control device". Further, an AND gate 50 corresponds to the foregoing "shutdown circuit".

According to the invention, a hybrid vehicle includes an internal combustion engine; a first motor generator generating an electric power using a motive power supplied from the internal combustion engine; a second motor generator generating a driving power of the vehicle; and the electric motor drive apparatus according to one of claims 2 to 4. The drive device included in the electric motor drive apparatus includes first and second inverters driving the first and second motor generators, respectively.

In each of the embodiments that will be described later, an engine 4 corresponds to the foregoing "internal combustion engine". A motor generator MG1 corresponds to the foregoing "first motor generator", and a motor generator MG2 corresponds to the foregoing "second motor generator". Further, an inverter 20 corresponds to the foregoing "first inverter", and an inverter 30 corresponds to the foregoing "second inverter".

Preferably, after the first and second inverters are shutdown according to the shutdown signal provided from the shutdown circuit included in the electric power drive apparatus, the control device included in the electric motor drive apparatus inactivates the shutdown permission signal when the control device determines that a limp-home run (batteryless run) performed by driving the second motor generator using the electric power generated by the first motor generator without using an electric power supplied from the DC power supply is allowed.

Preferably, after the first and second inverters are shutdown according to the shutdown signal provided from the shutdown circuit included in the electric power drive apparatus, the control device included in the electric motor drive apparatus inactivates the shutdown permission signal when the control device determines that a limp-home run (batteryless run) performed by driving the second motor generator using an electric power supplied from the DC power supply is allowed.

Further preferably, when the abnormality sensed by the abnormality sensing device included in the electric motor drive apparatus is not present, the internal combustion engine generates at least one of a drive power for generating the electric power by the first motor generator and a drive power for the vehicle, and the second motor generator generates the vehicle drive power, using the electric power supplied from at least one of the DC power supply and the first motor generator.

According to the invention, a stop control method of stopping an electric power converting device performing electric power conversion between a capacitance element smoothing a DC voltage and at least one electric motor, includes a first step of sensing an abnormality relating to the capacitance element; a second step of activating a shutdown permission signal for permitting shutdown of the electric power converting device before the abnormality is sensed; and a third step of shutting down the electric power converting device when the abnormality is sensed while the shutdown permission signal is active.

Preferably, the stop control method of the electric powers converting device includes a fourth step of determining whether a predetermined limp-home operation is allowed or not when the electric power converting device is in a shutdown state; and a fifth step of inactivating the shutdown permission signal when it is determined in the fourth step that the predetermined limp-home operation can be performed.

In this invention, the control device activates and provides the shutdown permission signal at least before the abnormality sensing device senses the abnormality. Therefore, when the signal from the abnormality sensing device becomes active, the shutdown circuit immediately activates the shutdown signal and provides it to the drive device. It can be considered that the abnormality sensing device senses the abnormality, e.g., in such cases that, due to a failure in the booster device, a current cannot flow from a high voltage side of the booster device to a low voltage side thereof or a voltage is supplied from the high voltage side of the booster device to the low voltage side thereof without being stepped down. In these cases, according to the invention, the drive device is immediately shut down in response to the sensing of the abnormality by the abnormality sensing device. Therefore, when the electric motor is being driven in the regenerative mode, the power supply from the electric motor immediately stops. Thereafter, a discharge resistor or the like performs discharge so that a voltage on a high voltage side of the booster device lowers.

Therefore, the invention can protect the capacitance element and the one additional capacitance element from overvoltage breakdown, and further can reduce margins of these capacitance elements. Consequently, sizes of these capacitance elements can be small. Further, other devices arranged on the low voltage side of the booster device are protected from the overvoltage breakdown.

Since the booster device is shut down when the signal from the abnormality sensing device becomes active, the invention can avoid the rising of the voltage across the opposite terminals of the capacitance element arranged on the low voltage side of the booster device. When the booster device is shut down while the electric motor is being driven in the regenerative mode, the voltage across the opposite terminals of the capacitance element arranged between the booster device and the electric motor may rise. In this case, when the abnormality sensing device senses the abnormality, the drive device is immediately shut down so that the invention can avoid the rising of the voltage across the opposite terminals of the capacitance element arranged between the booster device and the electric motor.

Accordingly, the invention can protect the capacitance element arranged between the booster device and the electric motor from the overvoltage breakdown, and further can reduce the margin of the capacitance element. Consequently, the sizes of the capacitance element can be small.

According to the invention, when the predetermined condition is satisfied after the drive device is shut down according to the shutdown signal, the control device inactivates the shutdown permission signal. Therefore, the drive device can operate even in the state where the abnormality sensed by the abnormality sensing device is present.

According to the invention, therefore, the electric motor can perform the limp-home operation even when the abnormality sensed by the abnormality sensing device is present.

In the invention, when the control device determines that the batteryless run by the first and second motor generators or the motor run by the second motor generator can be performed after shut-down of the first and second inverters according to the shutdown signal, the control device inactivates the shutdown permission signal. Therefore, even when the abnormality sensed by the abnormality sensing device is present, the first and second inverters can operate.

According to the invention, therefore, even when the abnormality sensed by the abnormality sensing device is present, it is possible to perform the batteryless run by the first and second motor generators as well as the motor run by the second motor generator.

BEST MODES FOR CARRYING OUT THE INVENTION

Embodiments of the invention will now be described with reference to the drawings. The same or corresponding portions bear the same reference numbers, and description thereof is not repeated.

First Embodiment

Figure 1:
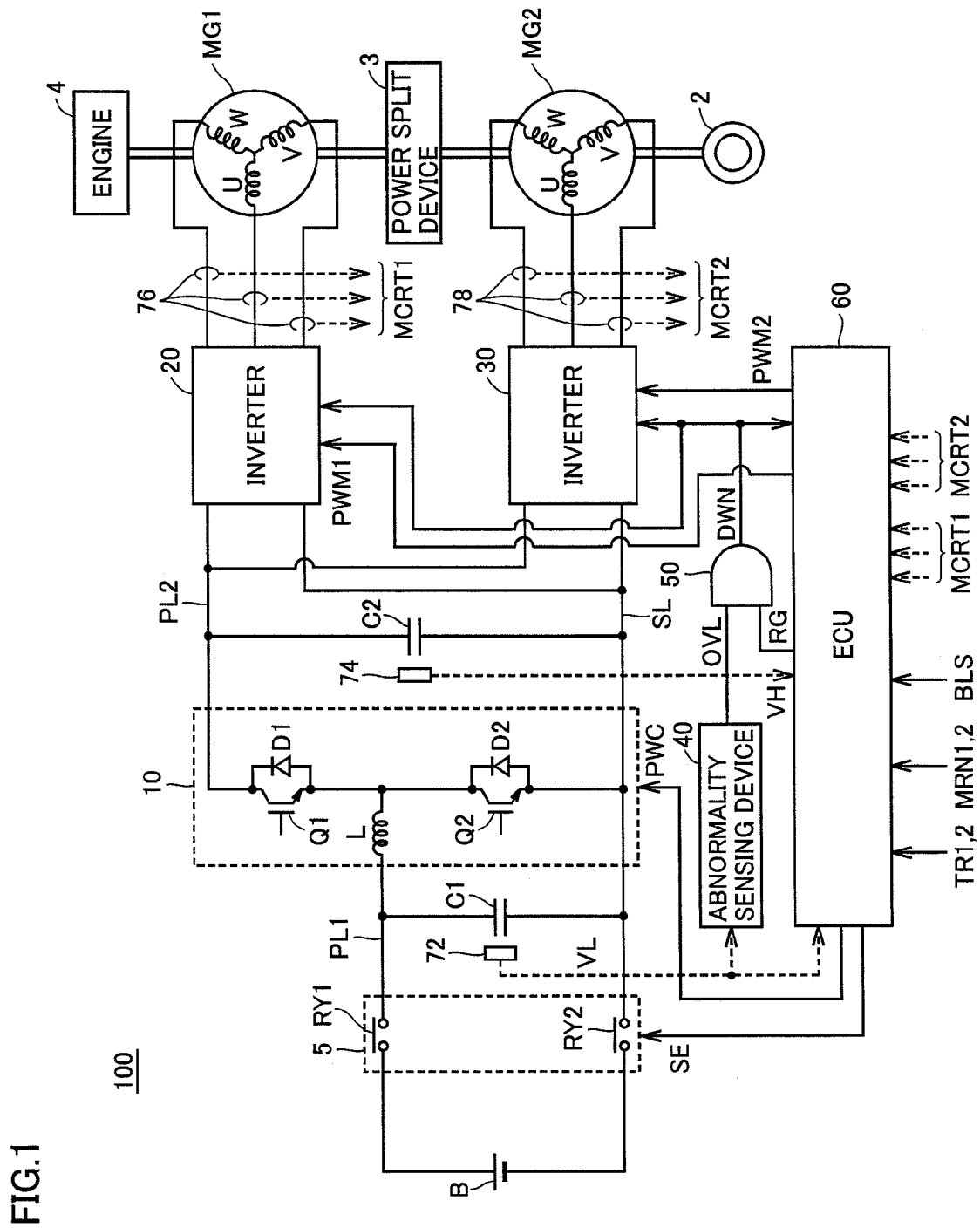
FIG. 1 is a schematic block diagram of a hybrid vehicle according to a first embodiment of the invention.

FIG. 1 is a schematic block diagram of a hybrid vehicle according to a first embodiment of the invention. Referring to FIG. 1, a hybrid vehicle 100 includes wheels 2, a power split device 3, an engine 4 and motor generators MG1 and MG2. Hybrid vehicle 100 also includes a power storage device B, a System Main Relay (which may also be referred to as an "SMR" hereinafter) 5, a booster converter 10, inverters 20 and 30, capacitors C1 and C2, power supply lines PL1 and PL2, a ground line SL, voltage sensors 72 and 74, and current sensors 76 and 78. Hybrid vehicle 100 further includes an abnormality sensing device 40, an AND gate 50 and an Electronic Control Unit (which may also be referred to as an "ECU" hereinafter) 60.

Power split device 3 is coupled to engine 4 and motor generators MG1 and MG2 for distributing a power to them. For example, power split device 3 may be formed of a planetary gear mechanism having a sun gear, a planetary carrier and a ring gear. Three rotation axes of them are connected to rotation axes of engine 4 and motor generators MG1 and MG2, respectively. For example, motor generator MG1 has a hollow rotor, and a crankshaft of engine 4 extends through the rotor so that engine 4 and motor generators MG1 and MG2 can be mechanically connected to power split device 3.

The rotation axis of motor generator MG2 is coupled to wheels 2 via a reduction gear and a differential gear (both not shown). A speed reducer for the rotation axis of motor generator MG2 may be additionally incorporated into power split device 3.

Motor generator MG1 is incorporated into hybrid vehicle 100 as a device that operates as an electric power generator driven by engine 4 and also operates as an electric motor for starting engine 4. Motor generator MG2 is incorporated into hybrid vehicle 100 as an electric motor for driving the drive wheels, i.e., wheels 2.

Power storage device B is a chargeable and dischargeable DC power supply, and is formed of a secondary battery such as nickel hydrogen battery or a lithium ion battery, for example. Power storage device B supplies a DC power to a power supply line PL1 via SMR 5. Power storage device B is charged with a DC power provided from booster converter 10 via power supply line PL1. Power storage device B may be formed of a capacitor having a large capacitance.

SMR 5 includes relays RY1 and RY2. Relay RY1 is connected between a positive terminal of power storage device B and power supply line PL1. Relay RY2 is connected between a negative terminal of power storage device B and ground line SL. When a signal SE from ECU 60 becomes active, relays RY1 and RY2 connect power storage device B to power supply line PL1 and ground line SL, respectively.

Capacitor C1 smoothes variations of a voltage between power supply line PL1 and ground line SL. Voltage sensor 72 senses a voltage VL across the opposite terminals of capacitor C1, and provides sensed voltage VL to ECU 60.

Booster converter 10 includes npn transistors Q1 and Q2, diodes D1 and D2, and a reactor L. Npn transistors Q1 and Q2 are connected in series between power supply line PL2 and ground line SL. Diodes D1 and D2 are connected in antiparallel to npn transistors Q1 and Q2, respectively. Reactor L is connected between power supply line PL1 and a node between npn transistors Q1 and Q2.

Booster converter 10 boosts the voltage on power supply line PL1 based on a signal PWC provided from ECU 60, and provides it onto power supply line PL2. More specifically, booster converter 10 accumulates, as a magnetic field energy in reactor L, the current that flows when npn transistor Q2 is on, and discharges the accumulated energy to power supply line PL2 via a diode D1 when npn transistor Q2 is off so that booster converter 10 boosts the voltage on power supply line PL1.

As an on-duty of npn transistor Q2 increases, the power accumulation in reactor L can increase so that a higher voltage can be output. As the on-duty of npn transistor Q1 increases, the voltage on power supply line PL2 lowers. Therefore, by controlling the duty ratio of npn transistors Q1 and Q2, the voltage on power supply line PL2 can be controlled to be equal to or higher than the voltage on power supply line PL1.

Capacitor C2 smoothes variations of the voltage placed between power supply line PL2 and ground line SL. Voltage sensor 74 senses a voltage VH across the opposite terminals of capacitor C2, and provides sensed voltage VH to ECU 60.

Inverters 20 and 30 are arranged corresponding to motor generators MG1 and MG2, respectively. Inverter 20 drives motor generator MG1 in a power running mode or a regenerative mode according to a signal PWM1 from ECU 60. Inverter 20 is shut down when a shutdown signal DWN received from AND gate 50 becomes active.

Inverter 30 drives motor generator MG2 in the power running mode or the regenerative mode according to a signal PWM2 from ECU 60. Inverter 30 is shut down when shutdown signal DWN received from AND gate 50 becomes active.

Current sensor 76 senses a motor current MCRT1 flowing through motor generator MG1, and provides sensed motor current MCRT1 to ECU 60. Current sensor 78 senses a motor current MCRT2 flowing through motor generator MG2, and provides sensed motor current MCRT2 to ECU 60.

Abnormality sensing device 40 receives voltage VL from voltage sensor 72. When voltage VL exceeds a threshold that is preset for protecting capacitor C1 from overvoltage breakdown, abnormality sensing device 40 activates a signal OVL and provides it to AND gate 50. When abnormality sensing device 40 senses an abnormality in itself, abnormality sensing device 40 activates signal OVL, and provides it to AND gate 50.

AND gate 50 performs logical AND between signal OVL from abnormality sensing device 40 and a shutdown permission signal RG from ECU 60, and provides a result of the logical AND, as shutdown signal DWN, to inverters 20 and 30 as well as ECU 60.

ECU 60 receives voltages VL and VH from respective voltage sensors 72 and 74, and receives motor currents MCRT1 and MCRT2 from respective current sensors 76 and 78. ECU 60 receives torque control values TR1 and TR2 as well as motor revolution speeds MRN1 and MRN2 from an external ECU (not shown).

Based on these signals, ECU 60 produces signals PWC, PWM1 and PWM2 for driving booster converter 10 and motor generators MG1 and MG2, respectively, and provides these produced signals PWC, PWM1 and PWM2 to booster converter 10 and inverters 20 and 30, respectively.

Further, ECU 60 receives shutdown signal DWN from AND gate 50, and receives a limp-home run permission signal BLS from the external ECU. Based on these signals, ECU 60 produces shutdown permission signal RG for permitting the shutdown of inverters 20 and 30 in a manner to be described later, and provides shutdown permission signal RG thus produced to AND gate 50.

Further, when the vehicle system starts, ECU 60 activates signal SE to be provided to SMR 5. When the vehicle system is shut down, ECU 60 inactivates signal SE.

Figure 2:
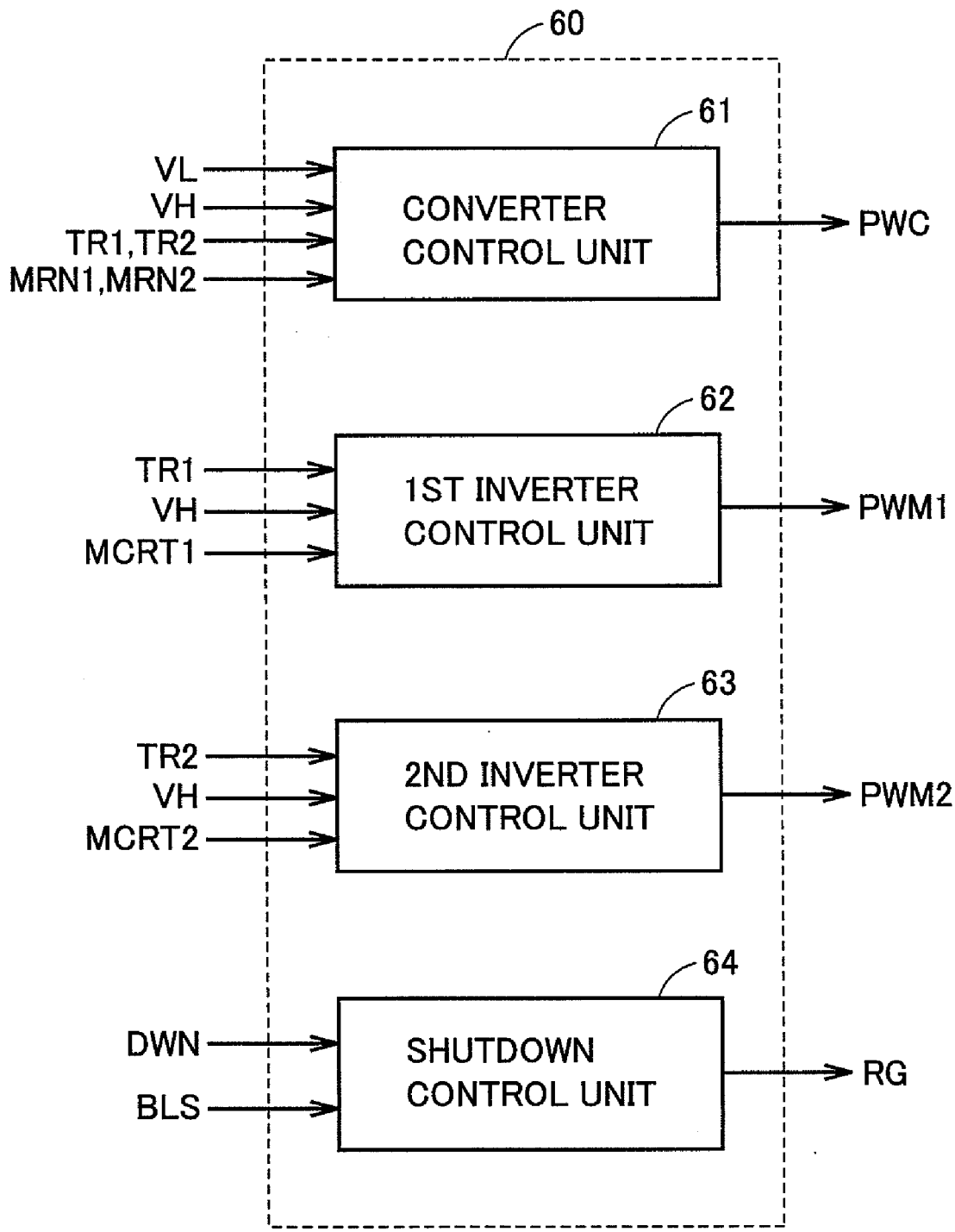
FIG. 2 is a functional block diagram of an ECU shown in FIG. 1.

FIG. 2 is a functional block diagram of ECU 60 shown in FIG. 1. Referring to FIG. 2, ECU 60 includes a converter control unit 61, first and second inverter control units 62 and 63, and a shutdown control unit 64.

Converter control unit 61 arithmetically obtains a voltage command of power supply line PL2 based on torque control values TR1 and TR2 as well as motor revolution speeds MRN1 and MRN2, and arithmetically obtains a feedback voltage command based on voltages VL and VH. Converter control unit 61 arithmetically obtains duty ratios of npn transistors Q1 and Q2 based on the feedback voltage command, produces a PWM (Pulse Width Modulation) signal for turning on/off npn transistors Q1 and Q2, and provides it as signal PWC to booster converter 10.

First inverter control unit 62 produces a PWM signal for driving inverter 20 based on torque control value TR1, voltage VH and motor current MCRT1, and provides the produced PMW signal as signal PWM1 to inverter 20.

Second inverter control unit 63 produces a PWM signal for driving inverter 30 based on torque control value TR2, voltage VH and motor current MCRT2, and provides the produced PWM signal as signal PWM2 to inverter 30.

Shutdown control unit 64 activates shutdown permission signal RG when shutdown signal DWN is inactive, and provides it to AND gate 50. More specifically, since shutdown signal DWN is a logical AND between signal OVL provided from abnormality sensing device 40 and shutdown permission signal RG, shutdown control unit 64 activates shutdown permission signal RG when abnormality sensing device 40 does not sense an abnormality.

Thereby, AND gate 50 immediately activates shutdown signal DWN in response to the activation of signal OVL provided from abnormality sensing device 40. Therefore, inverters 20 and 30 are immediately shut down in response to the activation of signal OVL.

In the state where shutdown signal DWN is active, and thus abnormality sensing device 40 senses an abnormality, shutdown control unit 64 inactivates shutdown permission signal RG to be output to AND gate 50, when limp-home run permission signal BLS received from the external ECU becomes active.

Limp-home run permission signal BLS becomes active when it is possible to perform limp-home run (batteryless run) in which the electric power from power storage device B is not used, and the run is performed by driving motor generator MG2 with the electric power generated by motor generator MG1, or to perform the limp-home run (battery run) in which motor generator MG2 is driven with the electric power supplied from power storage device B. Limp-home run permission signal BLS may be produced from determination by the external ECU whether the limp-home run is possible in the current state. A button for instructing the limp-home run may be employed for activating the signal when a driver operates the button.

When shutdown permission signal RG becomes inactive, AND gate 50 inactivates shutdown signal DWN so that inverters 20 and 30 are released from the shutdown state, and motor generators MG1 and MG2 can operate. Thereby, motor generators MG1 and MG2 can perform the limp-home run.

Figure 3:
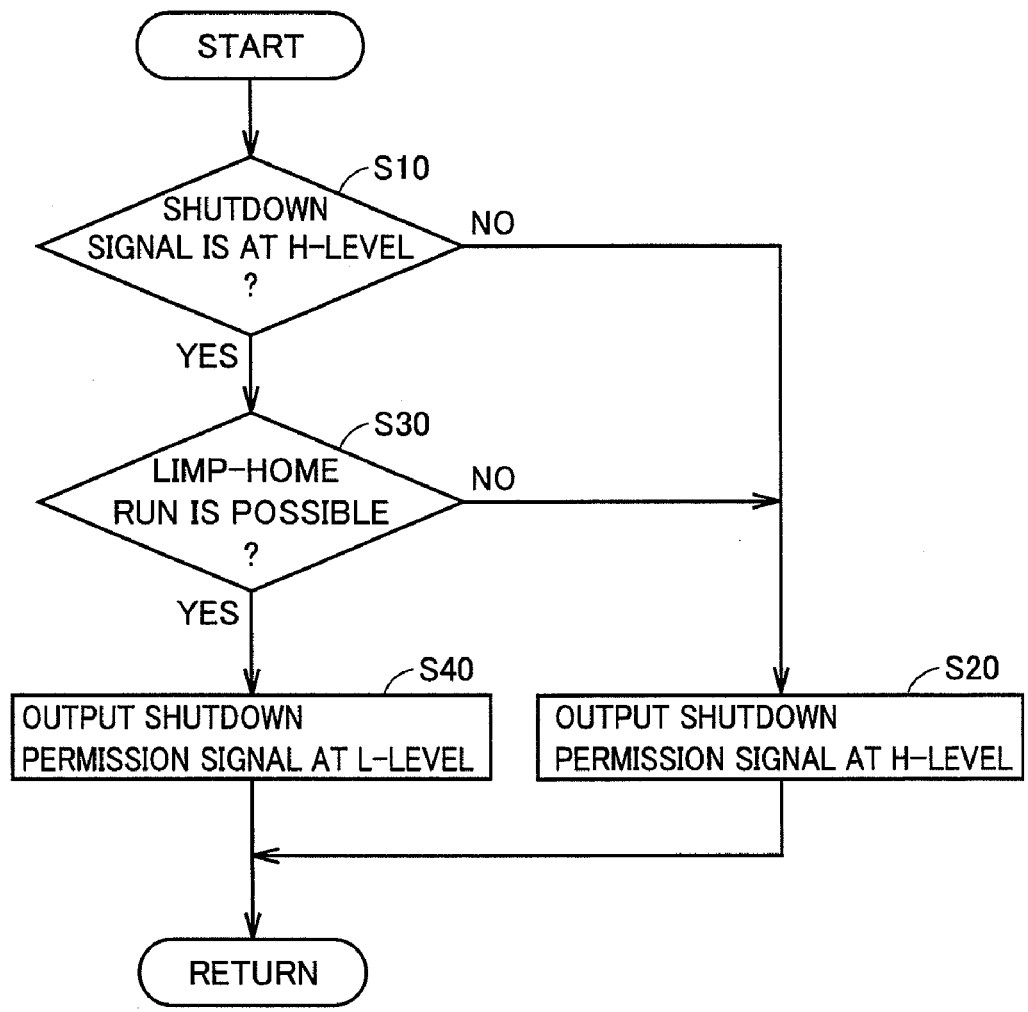
FIG. 3 is a flowchart illustrating a control structure of a shutdown control unit shown in FIG. 2.

FIG. 3 is a flowchart illustrating a control structure of shutdown control unit 64 shown in FIG. 2. Processing in this flowchart is called from a main routine for execution at predetermined intervals or every time a predetermined condition is satisfied.

Referring to FIG. 3, shutdown control unit 64 determines whether shutdown signal DWN received from AND gate 50 is at an H-level (logical high level) or not (step S10). When shutdown control unit 64 determines that shutdown signal DWN is not at the H-level, i.e., that shutdown signal DWN is at an L-level (logical low level) (NO in step S10), shutdown control unit 64 provides shutdown permission signal RG at the H-level to AND gate 50 (step S20).

When shutdown control unit 64 determines in step S10 that shutdown signal DWN is at the H-level (YES in step S10), it determines based on limp-home run permission signal BLS whether the limp-home run is permitted or not (step S30). When shutdown control unit 64 determines that the limp-home run is permitted (YES in step S30), it provides shutdown permission signal RG at the L-level to AND gate 50 (step S40). Conversely, when the limp-home run is not permitted (NO in step S30), shutdown control unit 64 forwards the processing to step S20.

Referring to FIG. 1 again, the whole operation of hybrid vehicle 100 will be described below. ECU 60 produces signal PWC based on voltages VL and VH, torque control values TR1 and TR2, and motor revolution speeds MRN1 and MRN2, and provides signal PWC thus produced to booster converter 10. Thereby, booster converter 10 boosts the voltage provided from power storage device B, and supplies it to inverters 20 and 30.

ECU 60 produces signal PWM1 based on voltage VH, torque control value TR1 and motor current MCRT1, and provides signal PWM1 thus produced to inverter 20. Further, ECU 60 produces signal PWM2 based on voltage VH, torque control value TR2 and motor current MCRT2, and provides signal PWM2 thus produced to inverter 30.

Thereby, inverter 20 converts the DC voltage supplied from booster converter 10 into a three-phase AC voltage to drive motor generator MG1. Inverter 30 converts the DC voltage supplied from booster converter 10 into a three-phase AC voltage to drive motor generator MG2. Thereby, motor generator MG1 generates a torque indicated by torque control value TR1, and motor generator MG2 generates a torque indicated by torque control value TR2.

Motor generator MG1 is coupled to engine 4 via power split device 3, and motor generator MG2 is coupled to wheels 2 via power split device 3. Motor generator MG1 starts engine 4, or generates an electric power, using the power provided from engine 4. Motor generator MG2 drives wheels 2, or generates an electric power during regenerative braking of the vehicle. Therefore, motor generator MG1 is primarily driven in the regenerative mode in which it generates the electric power, using the power supplied from engine 4. Motor generator MG2 is primarily driven in the power running mode in which the power for driving wheels 2 is generated.

Power storage device B functions as a buffer for storing a surplus electric power when the electric power generated by motor generator MG1 is larger than the power consumed by motor generator MG2, and for covering a shortage of the electric power when the power consumed by motor generator MG2 is larger than the power generated by motor generator MG1.

The case where abnormality sensing device 40 senses the overvoltage based on voltage VL to activate signal OVL will now be discussed. Voltage VL becomes the overvoltage, e.g., in such a situation that on-failure (not allowing turn-off) occurs in npn transistor Q1 forming an upper arm of booster converter 10 and the voltage on power supply line PL2 is supplied to power supply line PL1 without being stepped down by booster converter 10.

Before signal OVL becomes active, shutdown signal DWN from AND gate 50 is inactive so that shutdown permission signal RG to be provided to AND gate 50 is kept active by ECU 60. When abnormality sensing device 40 senses an abnormality to activate signal OVL, AND gate 50 immediately activates shutdown signal DWN in response to the activation of signal OVL because shutdown permission signal RG from ECU 60 is active. Therefore, inverters 20 and 30 are immediately shut down in response to the activation of signal OVL.

Thus, inverters 20 and 30 are immediately shut down when abnormality sensing device 40 senses the overvoltage based on voltage VL. Thereby, motor generators MG1 and MG2 immediately stop, and motor generator MG1 (or MG2) stops the power supply to power supply line PL2. Thereafter, the voltages on power supply lines PL2 and PL1 lower because a discharge resistor or auxiliary machinery (not shown) connected to power supply line PL1 consume the electric power.

When inverters 20 and 30 are shut down in response to activation of signal OVL and motor generators MG1 and MG2 stop, it becomes impossible in this state to implement the limp-home run by motor generators MG1 and MG2. Therefore, when limp-home run permission signal BLS becomes active, ECU 60 inactivates shutdown permission signal RG provided to AND gate 50. Thereby, AND gate 50 inactivates shutdown signal DWN to release inverters 20 and 30 from the shutdown state. Thereby, inverters 20 and 30 become active to allow the limp-home run using motor generators MG1 and MG2.

According to the first embodiment, as described above, ECU 60 activates and outputs shutdown permission signal RG before abnormality sensing device 40 senses the overvoltage of voltage VL. Thereby, when abnormality sensing device 40 senses the overvoltage and activates signal OVL, AND gate 50 immediately activates shutdown signal DWN and provides it to inverters 20 and 30. According to the first embodiment, therefore, even when the abnormality occurs and, for example, even when voltage VL across the opposite terminals of capacitor C1 may become the overvoltage due to the on-failure of the upper arm of booster converter 10, capacitor C1 can be protected from the overvoltage breakdown. The margin of capacitor C1 can be small so that capacitor C1 can be small in size. Further, the auxiliary machinery (not shown) connected to power supply line PL1 can be protected from the overvoltage breakdown.

In this first embodiment, when limp-home run permission signal BLS becomes active after inverters 20 and 30 are shut down according to shutdown signal DWN, ECU 60 inactivates shutdown permission signal RG. Thereby, even in the state where the abnormality sensed by abnormality sensing device 40 is present, inverters 20 and 30 can operate. Therefore, the first embodiment allows the limp-home run by motor generators MG1 and MG2 even when the abnormality sensed by abnormality sensing device 40 is present.

Second Embodiment

Figure 4:
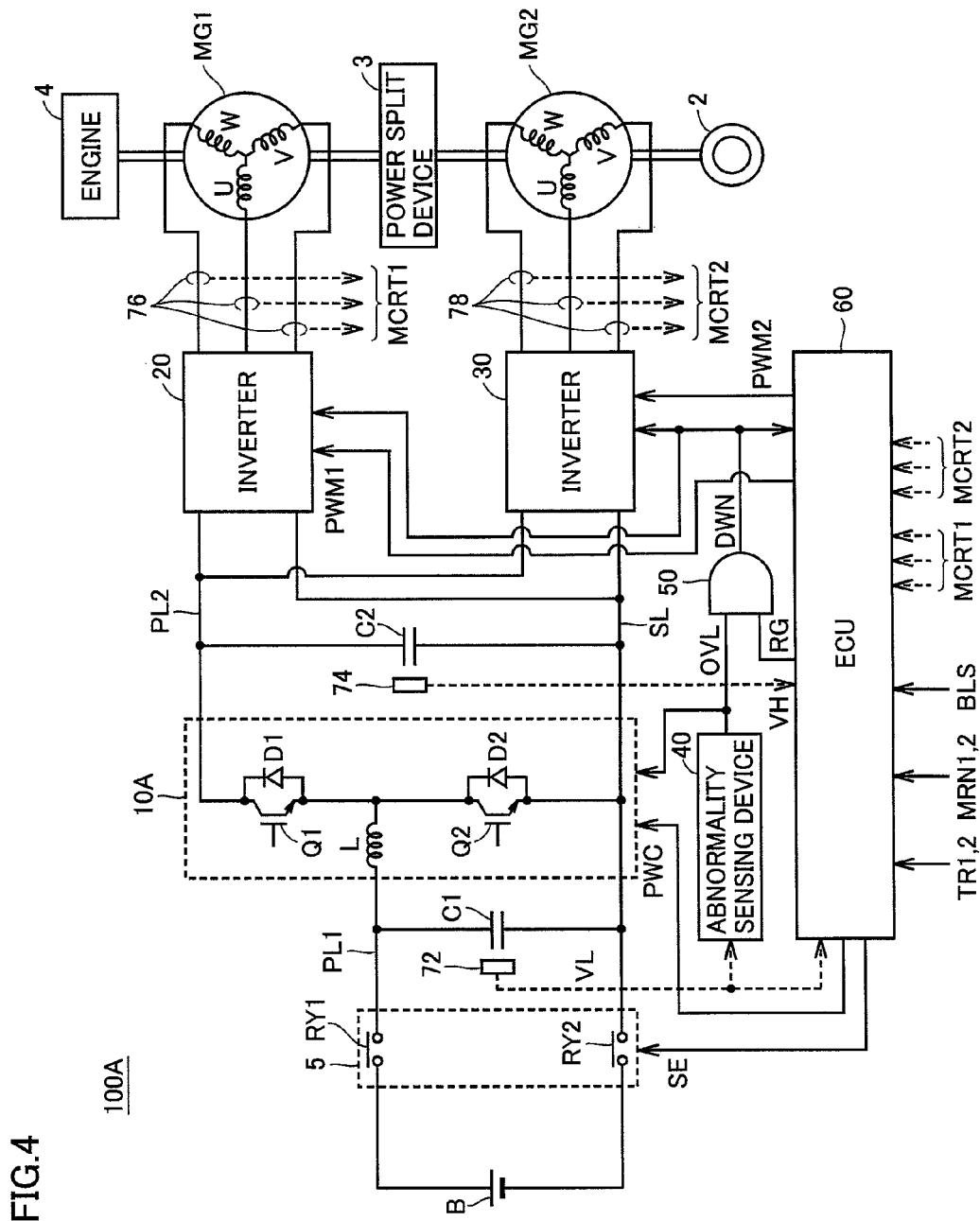
FIG. 4 is a schematic block diagram of a hybrid vehicle according to a second embodiment of the invention.

FIG. 4 is a schematic block diagram of a hybrid vehicle according to a second embodiment of the invention. Referring to FIG. 4, a hybrid vehicle 100A includes a booster converter 10A instead of booster converter 10 in the structure of hybrid vehicle 100 according to the first embodiment shown in FIG. 1.

Booster converter 10A differs from booster converter 10 in the first embodiment shown in FIG. 1 in that booster converter 10A receives signal OVL from abnormality sensing device 40. Booster converter 10A is shut down when signal OVL received from abnormality sensing device 40 becomes active.

The other structures and functions of booster converter 10A are the same as those of booster converter 10 in the first embodiment. The other structures of hybrid vehicle 100A are the same as those of hybrid vehicle 100 of the first embodiment.

Description will be given on the case where abnormality sensing device 40 senses the overvoltage based on voltage VL and activates signal OVL in hybrid vehicle 100A. Voltage VL becomes the overvoltage, e.g., in such a situation that a wire in SMR 5 breaks when inverters 20 and 30 are supplying a surplus electric power to power storage device B via booster converter 10.

When the break occurs in SMR 5 to isolate power storage device B functioning as a buffer from power supply line PL1 and ground line SL, voltage VL rises, and abnormality sensing device 40 senses the abnormality. Thereby, signal OVL becomes active, and booster converter 10A is shut down in response to the activation of signal OVL. Thereby, a current no longer flows from power supply line PL2 to power supply line PL1 so that the rising of voltage VL is suppressed. Consequently, capacitor C1 is protected from the overvoltage breakdown.

When the current does not flow from power supply line PL2 to power supply line PL1 due to shutdown of booster converter 10A, voltage VH may rise. However, when signal OVL becomes active, AND gate 50 activates shutdown signal DWN immediately in response to the activation of signal OVL because shutdown permission signal RG from ECU 60 is active. Thereby, inverters 20 and 30 are immediately shut down in response to the activation of signal OVL.

More specifically, when abnormality sensing device 40 senses the overvoltage based on voltage VL, inverters 20 and 30 are immediately shut down, and the rising of voltage VH is avoided.

In response to the activation of signal OVL, inverters 20 and 30 are shut down. Thereby, the limp-home run is implemented after the stop of motor generators MG1 and MG2 in the substantially same manner as that in the first embodiment.

According to the second embodiment, as described above, even when such an abnormality occurs that voltage VL across the opposite terminals of capacitor C1 as well as voltage VH across the opposite terminals of capacitor C2 may become overvoltages due to the break in SMR 5, capacitors C1 and C2 can be protected from the overvoltage breakdown. Further, the margins of capacitors C1 and C2 can be small so that the sizes of capacitors C1 and C2 can be small.

In the second embodiment, ECU 60 inactivates shutdown permission signal RG when limp-home run permission signal BLS becomes active after inverters 20 and 30 are shut down in response to shutdown signal DWN. Thereby, even when the abnormality sensed by abnormality sensing device 40 is present, inverters 20 and 30 can operate. Therefore, the second embodiment allows the limp-home run using motor generators MG1 and MG2 even when the abnormality sensed by abnormality sensing device 40 is present.

Third Embodiment

Figure 5:
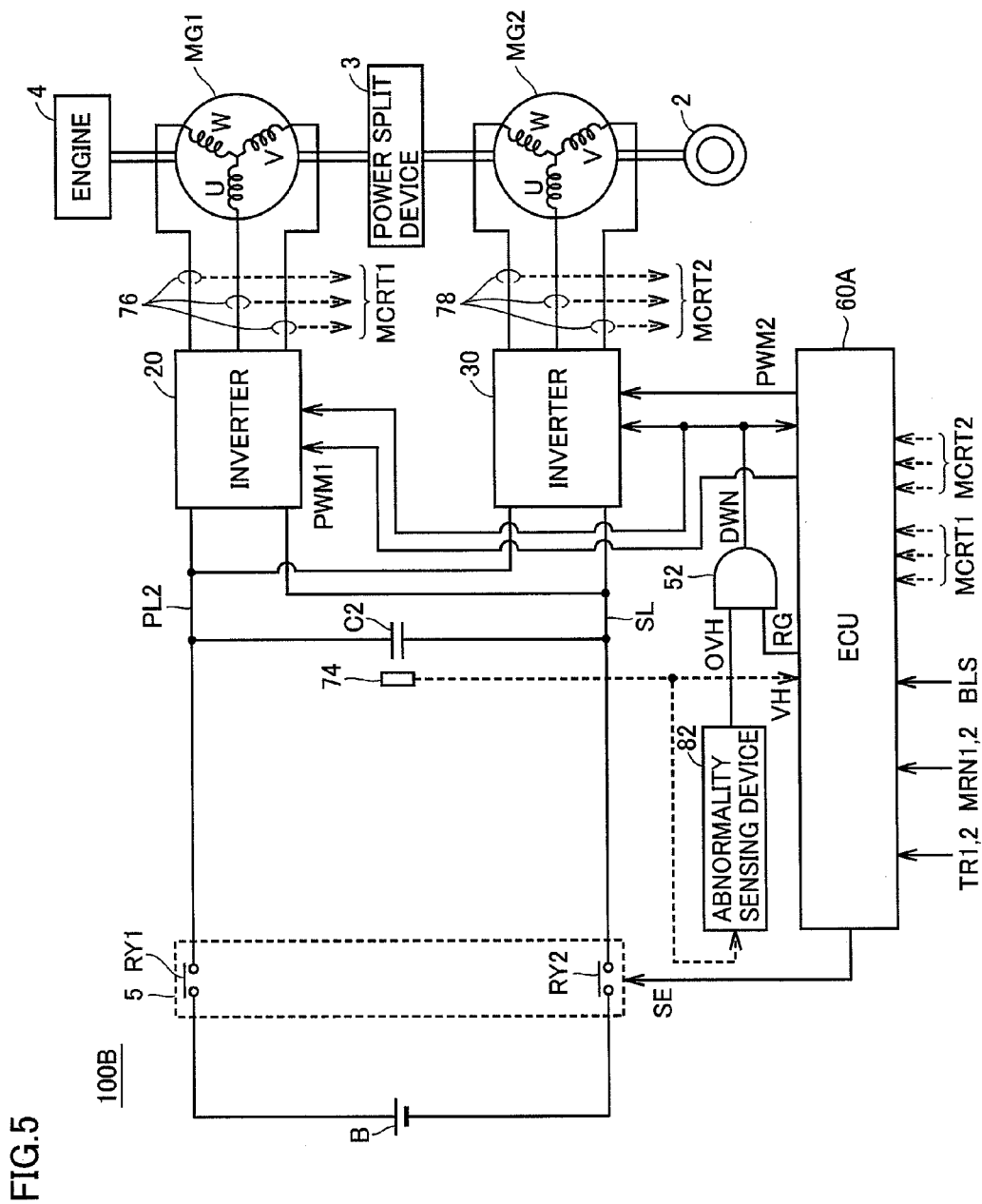
FIG. 5 is a schematic block diagram of a hybrid vehicle of a third embodiment of the invention.

FIG. 5 is a schematic block diagram of a hybrid vehicle according to a third embodiment of the invention. Referring to FIG. 5, a hybrid vehicle 100B differs from the structure of hybrid vehicle 100 in the first embodiment of the invention shown in FIG. 1 in that booster converter 10, capacitor C1 and voltage sensor 72 are not employed. Relay RY1 of SMR 5 is connected between the positive terminal of power storage device B and power supply line PL2. Further, hybrid vehicle 100B includes an abnormality sensing device 82, an AND gate 52 and an ECU 60A instead of abnormality sensing device 40, AND gate 50 and ECU 60 shown in FIG. 1, respectively.

Abnormality sensing device 82 receives voltage VH from voltage sensor 74. When voltage VH exceeds a threshold that is preset for protecting capacitor C2 from overvoltage breakdown, abnormality sensing device 82 activates a signal OVH and provides it to AND gate 52. When abnormality sensing device 82 senses an abnormality in itself, abnormality sensing device 82 likewise activates signal OVH and provides it to AND gate 52.

In this third embodiment, abnormality sensing device 82 may sense the overvoltage of voltage VH, and it can be considered that this situation, i.e., the sensing of the overvoltage occurs when the break occurs in SMR 5 while inverters 20 and 30 is supplying a surplus power to power storage device B via SMR 5.

AND gate 52 performs logical AND between signal OVH from abnormality sensing device 82 and shutdown permission signal RG from ECU 60A, and provides a result of the logical AND as shutdown signal DWN to inverters 20 and 30 as well as ECU 60A.

The function of ECU 60A is the same as that of ECU 60 shown in FIG. 1 except for that it does not produce signal PWC for driving booster converter 10. The structure of ECU 60A is the same as that of ECU 60 shown in FIG. 2 except for that converter control unit 61 is not employed.

The other structures of hybrid vehicle 100B are the same as those of hybrid vehicle 100 shown in FIG. 1.

In hybrid vehicle 100B, before signal OVH becomes active, shutdown signal DWN from AND gate 52 is inactive so that shutdown permission signal RG provided to AND gate 52 is kept active by ECU 60A. When abnormality sensing device 82 senses the abnormality and activates signal OVH, AND gate 52 immediately activates shutdown signal DWN in response to the activation of signal OVH because shutdown permission signal RG from ECU 60A is active. Therefore, inverters 20 and 30 are immediately shut down in response to the activation of signal OVH.

When abnormality sensing device 82 senses the overvoltage based on voltage VH, inverters 20 and 30 are immediately shut down. Thereby, motor generators MG1 and MG2 immediately stop, and motor generator MG1 (or MG2) no longer supplies the electric power to power supply line PL2. Thereafter, the discharge resistor, auxiliary machinery and the like (not shown) consume the electric power so that the voltage on power supply line PL2 lowers.

When inverters 20 and 30 are shut down to stop motor generators MG1 and MG2 in response to the activation of signal OVH, it becomes impossible in this state to implement the limp-home run using motor generators MG1 and MG2. Therefore, when limp-home run permission signal BLS becomes active, ECU 60A inactivates shutdown permission signal RG provided to AND gate 52. Thereby, AND gate 52 inactivates shutdown signal DWN to release inverters 20 and 30 from the shutdown state. Thereby, inverters 20 and 30 become active, and the limp-home run can be performed using motor generators MG1 and MG2.

In the third embodiment, as described above, ECU 60A activates and outputs shutdown permission signal RG before abnormality sensing device 82 senses the overvoltage of voltage VH. Thereby, when abnormality sensing device 82 senses the overvoltage and activates signal OVH, AND gate 52 immediately activates shutdown signal DWN to provide it to inverters 20 and 30. In the third embodiment, therefore, even when an abnormality occurs and, for example, even when voltage VH across the opposite terminals of capacitor C2 may become an overvoltage due to the break in SMR 5, capacitor C2 can be protected from the overvoltage breakdown. Also, the margin of capacitor C2 can be small so that sizes of capacitor C2 can be small. Further, the auxiliary machinery (not shown) connected to power supply line PL2 can be protected from the overvoltage breakdown.

In the third embodiment, ECU 60A inactivates shutdown permission signal RG when limp-home run permission signal BLS becomes active after inverters 20 and 30 are shut down in response to shutdown signal DWN. Thereby, even in the state where the abnormality sensed by abnormality sensing device 82 is present, inverters 20 and 30 can operate. Therefore, the third embodiment allows the limp-home run using motor generators MG1 and MG2 even when the abnormality sensed by abnormality sensing device 82 is present.

Fourth Embodiment

Figure 6:
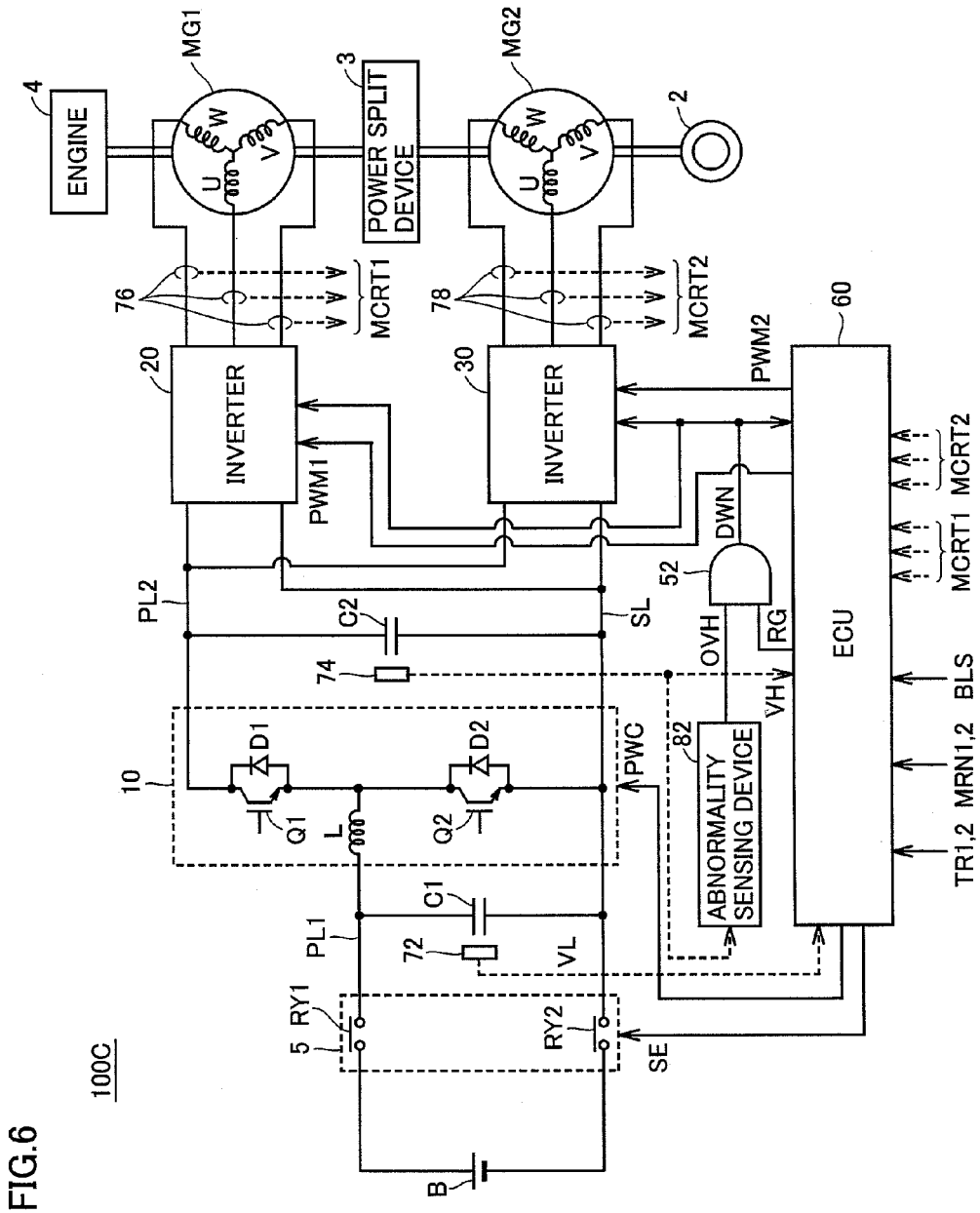
FIG. 6 is a schematic block diagram of a hybrid vehicle of a fourth embodiment of the invention.

FIG. 6 is a schematic block diagram of a hybrid vehicle according to a fourth embodiment of the invention. Referring to FIG. 6, a structure of a hybrid vehicle 100C differs from that of hybrid vehicle 100 of the first embodiment shown in FIG. 1 in that abnormality sensing device 82 and AND gate 52 are employed instead of abnormality sensing device 40 and AND gate 50.

Abnormality sensing device 82 and AND gate 52 are already described in connection with the third embodiment, and therefore description thereof is not repeated.

Abnormality sensing device 82 senses the overvoltage of voltage VH, e.g., in such a situation that the off-failure (not allowing turn-on) occurs in npn transistor Q1 forming the upper arm of booster converter 10 so that the current cannot flow from power supply line PL2 to power supply line PL1.

In this fourth embodiment, before signal OVH becomes active, shutdown signal DWN from AND gate 52 is inactive similarly to the third embodiment so that ECU 60 has already activated shutdown permission signal RG provided to AND gate 52. Therefore, when signal OVH becomes active, shutdown signal DWN immediately becomes active in response to it, and inverters 20 and 30 are immediately shut down. Thereby, motor generators MG1 and MG2 immediately stop, and motor generator MG1 (or MG2) no longer supplies the electric power to power supply line PL2. As a result, the rising of voltage VH is suppressed, and capacitor C2 is protected from the overvoltage breakdown.

When limp-home run permission signal BLS becomes active, ECU 60 inactivates shutdown permission signal RG provided to AND gate 52. Thereby, shutdown signal DWN becomes inactive to release inverters 20 and 30 from the shutdown state. Thereby, inverters 20 and 30 become active, and allow the limp-home run using motor generators MG1 and MG2.

As described above, the fourth embodiment can achieve substantially the same effect as the third embodiment.

The above structure may be configured such that booster converter 10 is shut down when signal OVH from abnormality sensing device 82 becomes active, similarly to the second embodiment. This configuration suppresses the rising of voltage VL, and can also protect capacitor C1 from the overvoltage breakdown.

Fifth Embodiment

A fifth embodiment performs the abnormality sensing based on both voltage VL on the low voltage side of booster converter 10 and voltage VH on the high voltage side.

Figure 7:
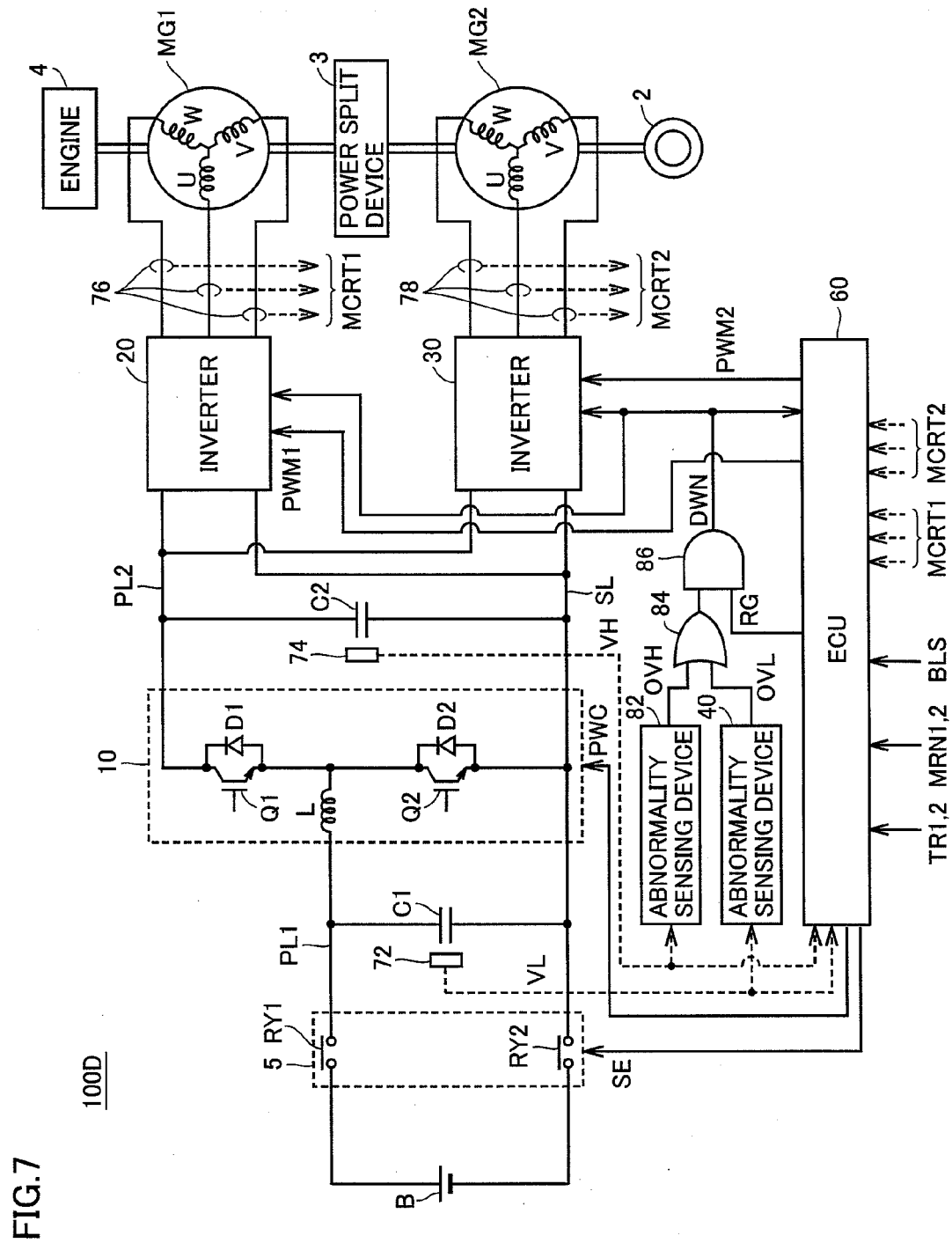
FIG. 7 is a schematic block diagram of a hybrid vehicle of a fifth embodiment of the invention.

FIG. 7 is a schematic block diagram of a hybrid vehicle according to the fifth embodiment of the invention. Referring to FIG. 7, a hybrid vehicle 100D has the same structure as hybrid vehicle 100 of the first embodiment shown in FIG. 1 except for that hybrid vehicle 100D further includes abnormality sensing device 82, and includes an OR gate 84 and an AND gate 86 instead of AND gate 50.

OR gate 84 performs logical OR between signal OVL from abnormality sensing device 40 and signal OVH from abnormality sensing device 82, and provides a result of the local OR to AND gate 86. AND gate 86 performs logical AND between an output of OR gate 84 and shutdown permission signal RG from ECU 60, and provides a result of the logical AND as shutdown signal DWN to inverters 20 and 30 as well as ECU 60.

Abnormality sensing device 82 is already described in connection with the third embodiment, and therefore description thereof is not repeated. The other structures of hybrid vehicle 100D are the same as those of hybrid vehicle 100 of the first embodiment.

In the fifth embodiment, before signals OVL and OVH become active, shutdown signal DWN provided from AND gate 86 is inactive so that ECU 60 has already activated shutdown permission signal RG provided to AND gate 86. Therefore, when one of signals OVL and OVH becomes active, shutdown signal DWN immediately becomes active in response to such activation, and inverters 20 and 30 are immediately shut down. Thereby, motor generators MG1 and MG2 immediately stop, and the power supply from motor generator MG1 (or MG2) to power supply line PL2 stops. Consequently, the rising of voltage VH is suppressed, and capacitor C2 is protected from the overvoltage breakdown.

When limp-home run permission signal BLS becomes active, ECU 60 inactivates shutdown permission signal RG provided to AND gate 86. Thereby, shutdown signal DWN becomes inactive, and inverters 20 and 30 are released from the shutdown state. Thereby, inverters 20 and 30 become active, and allow the limp-home run using motor generators MG1 and MG2.

As described above, the fifth embodiment can protect capacitors C1 and C2 from the overvoltage breakdown. The margins of capacitors C1 and C2 can be small. Consequently, the sizes of capacitors C1 and C2 can be small. Further, even when the abnormality sensed by abnormality sensing device 40 or 82 is present, the limp-home run using motor generators MG1 and MG2 can be performed.

The fifth embodiment may be configured such that booster converter 10 is shut down when signal OVL from abnormality sensing device 40 or signal OVH from abnormality sensing device 82 becomes active, similarly to the second embodiment.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. An electric motor drive apparatus comprising:
   a capacitance element smoothing a DC voltage;
   an electric power converting device performing electric power conversion between said capacitance element and at least one electric motor;
   an abnormality sensing device sensing an abnormality relating to said capacitance element, and providing a signal being activated when the abnormality is sensed;
   a control device activating and providing a shutdown permission signal for permitting shutdown of said electric power converting device at least before said abnormality sensing device senses the abnormality; and
   a shutdown circuit activating a shutdown signal instructing shutdown of said electric power converting device and providing the shutdown signal to said electric power converting device when the signal provided from said abnormality sensing device becomes active while said shutdown permission signal is active.

2. The electric motor drive apparatus according to claim 1, further comprising:
   a DC power supply; and
   a booster device boosting a voltage provided from said DC power supply and providing the boosted voltage to said capacitance element, wherein
   said electric power converting device includes a drive device converting the voltage provided from said capacitance element and driving said at least one electric motor.

3. The electric motor drive apparatus according to claim 1, further comprising:
   a DC power supply providing a voltage to said capacitance element, wherein
   said electric power converting device includes:
   a booster device boosting a voltage provided from said capacitance element; and
   a drive device converting the voltage boosted by said booster device and driving said at least one electric motor, and
   said shutdown circuit activates said shutdown signal and provides the shutdown signal to said drive device when the signal provided from said abnormality sensing device becomes active while said shutdown permission signal is active.

4. The electric motor drive apparatus according to claim 1, further comprising:
   a DC power supply;
   one additional capacitance element smoothing the voltage supplied from said DC power supply; and
   a booster device boosting a voltage supplied from said one additional capacitance element and providing the boosted voltage to said capacitance element, wherein
   said electric power converting device includes a drive device converting the voltage supplied from said capacitance element and driving said at least one electric motor, and
   said abnormality sensing device further senses an abnormality relating to said one additional capacitance element, and activates said signal when the abnormality is sensed in at least one of said capacitance element and said one additional capacitance element.

5. The electric motor drive apparatus according to claim 2, wherein
   said booster device is shut down when the signal from said abnormality sensing device becomes active.

6. The electric motor drive apparatus according to claim 2, wherein
   said control device inactivates said shutdown permission signal when a predetermined condition is satisfied after the drive device of said electric power converting device is shut down according to said shutdown signal.

7. The electric motor drive apparatus according to claim 6, wherein
   said drive device can drive first and second electric motors corresponding to said at least one electric motor in a regenerative mode and a power running mode, respectively, and
   said predetermined condition is satisfied when a limp-home operation of driving said second electric motor using an electric power generated by said first electric motor without using an electric power supplied from said DC power supply is allowed.

8. The electric motor drive apparatus according to claim 6, wherein
   said drive device can drive first and second electric motors corresponding to said at least one electric motor in a regenerative mode and a power running mode, respectively, and
   said predetermined condition is satisfied when a limp-home operation of driving said second electric motor using an electric power supplied from said DC power supply is allowed.

9. The electric motor drive apparatus according to claim 7, wherein
   said first electric motor is coupled to an internal combustion engine; and
   when the abnormality sensed by said abnormality sensing device is not present,
   said internal combustion engine generates at least one of a drive power for generating the electric power by said first electric motor and a drive power for a vehicle, and
   said second electric motor generates said vehicle drive power, using the electric power supplied from at least one of said DC power supply and said first electric motor.

10. The electric motor drive apparatus according to claim 1, wherein
    said abnormality sensing device activates said signal when a voltage across opposite terminals of said capacitance element exceeds a predetermined threshold.

11. The electric motor drive apparatus according to claim 1, wherein when said abnormality sensing device senses an abnormality in itself, said abnormality sensing device activates said signal.

12. The electric motor drive apparatus according to claim 4, wherein said abnormality sensing device activates said signal when a voltage across opposite terminals of said capacitance element or said one additional capacitance element exceeds a predetermined threshold.

13. An electric motor drive apparatus comprising:
a DC power supply;
a capacitance element smoothing a voltage supplied from said DC power supply;
a booster device boosting a voltage supplied from said capacitance element;
first and second drive devices driving first and second electric motors based on the voltage boosted by said booster device, respectively;
a voltage sensing device sensing a voltage across opposite terminals of said capacitance element;
an abnormality sensing device providing a signal to be activated when the voltage sensed by said voltage sensing device exceeds a predetermined threshold;
a control device activating and providing a shutdown permission signal for permitting shutdown of said first and second drive devices at least before said abnormality sensing device senses the abnormality; and
a shutdown circuit activating a shutdown signal instructing shutdown of said first and second drive devices and providing the shutdown signal to said first and second drive devices when the signal provided from said abnormality sensing device becomes active while said shutdown permission signal is active.

14. A hybrid vehicle comprising:
an internal combustion engine;
a first motor generator generating an electric power using a motive power supplied from said internal combustion engine;
a second motor generator generating a driving power of the vehicle; and
the electric motor drive apparatus according to claim 2, wherein
the drive device included in said electric motor drive apparatus includes first and second inverters driving said first and second motor generators, respectively.

15. The hybrid vehicle according to claim 14, wherein
after said first and second inverters are shutdown according to the shutdown signal provided from the shutdown circuit included in said electric motor drive apparatus, the control device included in said electric motor drive apparatus inactivates said shutdown permission signal when the control device determines that a limp-home run performed by driving said second motor generator using the electric power generated by said first motor generator without using an electric power supplied from said DC power supply is allowed.

16. The hybrid vehicle according to claim 14, wherein
after said first and second inverters are shutdown according to the shutdown signal provided from the shutdown circuit included in said electric motor drive apparatus, the control device included in said electric motor drive apparatus inactivates said shutdown permission signal when the control device determines that a limp-home run performed by driving said second motor generator using an electric power supplied from said DC power supply is allowed.

17. The hybrid vehicle according to claim 15, wherein
when the abnormality sensed by the abnormality sensing device included in said electric motor drive apparatus is not present,
said internal combustion engine generates at least one of a drive power for generating the
electric power by said first motor generator and a drive power for the vehicle, and
said second motor generator generates said vehicle drive power, using the electric power supplied from at least one of said DC power supply and said first motor generator.

* * * * *